(12) United States Patent
Ikeda

(10) Patent No.: US 10,576,547 B2
(45) Date of Patent: Mar. 3, 2020

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Yoshihito Ikeda, Ritto (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/777,835

(22) PCT Filed: Nov. 28, 2016

(86) PCT No.: PCT/JP2016/085188
§ 371 (c)(1),
(2) Date: May 21, 2018

(87) PCT Pub. No.: WO2017/090770
PCT Pub. Date: Jun. 1, 2017

(65) Prior Publication Data
US 2018/0345383 A1  Dec. 6, 2018

(30) Foreign Application Priority Data
Nov. 28, 2015  (JP) .................................. 2015-232495

(51) Int. Cl.
*B23B 27/14* (2006.01)
*B23B 27/16* (2006.01)

(52) U.S. Cl.
CPC ........ *B23B 27/145* (2013.01); *B23B 27/1611* (2013.01); *B23B 2200/0452* (2013.01);
(Continued)

(58) Field of Classification Search
CPC ...... B23B 2200/0452; B23B 2200/201; B23B 2200/202; B23B 2200/208; B23B 27/145;
(Continued)

(56) References Cited

U.S. PATENT DOCUMENTS 4,681,488 A * 7/1987 Markusson ............. B23C 5/202
  407/113
5,634,745 A * 6/1997 Wiman ................. B23B 27/141
  407/113

(Continued)

FOREIGN PATENT DOCUMENTS

EP  1297921 A1  4/2003
EP  3023183 A1  5/2016
(Continued)

*Primary Examiner* — Sara Addisu
(74) *Attorney, Agent, or Firm* — Viering, Jentschura & Partner MBB

(57) ABSTRACT

A cutting insert according to an aspect includes a top surface and a side surface. At least a part of a ridge line where the top surface and the side surface intersects is a cutting edge. The cutting edge includes a first portion located at a corner portion, a second portion adjacent to the first portion, a third portion close to the second portion, a fourth portion close to the third portion, and a fifth portion adjacent to the fourth portion. When viewed from directly above, a curvature radius of the second portion is less than a curvature radius of the first portion, a curvature radius of the third portion is greater than the curvature radius of the first portion, and a curvature radius of the fourth portion is less than the curvature radius of the third portion.

13 Claims, 9 Drawing Sheets

(52) U.S. Cl.
CPC ... *B23B 2200/201* (2013.01); *B23B 2200/202* (2013.01); *B23B 2200/208* (2013.01); *B23B 2222/16* (2013.01); *B23B 2224/20* (2013.01); *B23B 2224/28* (2013.01); *B23B 2224/32* (2013.01); *B23B 2224/36* (2013.01); *B23B 2228/04* (2013.01); *B23B 2228/08* (2013.01); *B23C 2200/208* (2013.01)

(58) Field of Classification Search
CPC ............ B23B 27/1611; B23B 2222/16; B23B 2224/20; B23B 2224/28; B23B 2224/32; B23B 2224/36
See application file for complete search history.

(56) References Cited

U.S. PATENT DOCUMENTS

| | | | | |
|---|---|---|---|---|
| 6,217,263 | B1 * | 4/2001 | Wiman | B23B 27/141 |
| | | | | 407/114 |
| 6,244,791 | B1 * | 6/2001 | Wiman | B23B 27/141 |
| | | | | 407/114 |
| 6,527,486 | B2 * | 3/2003 | Wiman | B23B 27/141 |
| | | | | 407/113 |
| 6,715,967 | B2 | 4/2004 | Wiman et al. | |
| 7,008,148 | B2 * | 3/2006 | Wiman | B23B 27/141 |
| | | | | 407/113 |
| 7,765,902 | B2 * | 8/2010 | Kuroda | B23B 27/145 |
| | | | | 407/113 |
| 7,905,689 | B2 * | 3/2011 | Dufour | B23C 5/207 |
| | | | | 407/113 |
| 7,976,250 | B2 * | 7/2011 | Fang | B23C 5/109 |
| | | | | 407/113 |
| 8,057,132 | B2 * | 11/2011 | Johansson | B23C 5/202 |
| | | | | 407/113 |
| 8,485,764 | B2 * | 7/2013 | Xu | B23C 5/06 |
| | | | | 407/113 |
| 8,523,497 | B2 * | 9/2013 | Uno | B23C 5/06 |
| | | | | 407/42 |
| 2003/0086767 | A1 * | 5/2003 | Wiman | B23B 27/141 |
| | | | | 407/114 |
| 2004/0146365 | A1 * | 7/2004 | Usui | B23B 27/145 |
| | | | | 407/113 |
| 2006/0188347 | A1 * | 8/2006 | Kratz | B23B 27/145 |
| | | | | 407/113 |
| 2006/0228179 | A1 * | 10/2006 | Alm | B23B 27/145 |
| | | | | 407/113 |
| 2016/0288224 | A1 * | 10/2016 | Ishi | B23C 5/207 |

FOREIGN PATENT DOCUMENTS

| | | | |
|---|---|---|---|
| JP | 2003275920 | A * | 9/2003 |
| JP | 2004-237438 | A | 8/2004 |
| JP | 2006-224295 | A | 8/2006 |
| JP | 2010-537835 | A | 12/2010 |
| WO | 95/32071 | A1 | 11/1995 |
| WO | 2009/029021 | A1 | 3/2009 |
| WO | 2015/008724 | A1 | 1/2015 |
| WO | 2016/190351 | A1 | 12/2016 |

* cited by examiner

CUTTING INSERT, CUTTING TOOL, AND METHOD FOR MANUFACTURING MACHINED PRODUCT

TECHNICAL FIELD

The present aspect relates to a cutting insert, a cutting tool, and a method for manufacturing a machined product.

BACKGROUND ART

An insert described in Patent Document 1 (Japanese Unexamined Patent Publication No. 2004-237438), for example, is known as a cutting insert used for turning processing. The insert described in Patent Document 1 includes a nose cutting edge, a first flat cutting edge (wiper edge), and a second flat cutting edge. Then, a curvature radius of the first flat cutting edge is greater than a curvature radius of the nose cutting edge, and a curvature radius of the second flat cutting edge is greater than the curvature radius of the first flat cutting edge.

In a tip described in Patent Document 1, the curvature radius of the first flat cutting edge is greater than the curvature radius of the nose cutting edge. Accordingly, while a region of the nose cutting edge can be reduced in width, machined surface accuracy may decrease in processing in which a work material is repeatedly cut by the wiper edge.

SUMMARY OF INVENTION

A cutting insert according to an aspect includes a top surface including a first corner portion and a first side portion extending from the first corner portion, and a side surface adjacent to the top surface. A ridge line where the top surface and the side surface intersects includes a first portion located at the first corner portion, a second portion adjacent to the first portion, a third portion close to the second portion, a fourth portion close to the third portion, and a fifth portion adjacent to the fourth portion and located at the first side portion. When viewed from directly above, the first portion, the second portion, the third portion, and the fourth portion each have a circular arc shape. When viewed from directly above, a curvature radius R2 of the second portion is less than a curvature radius R1 of the first portion, a curvature radius R3 of the third portion is greater than the curvature radius R1 of the first portion, and a curvature radius R4 of the fourth portion is less than the curvature radius R3 of the third portion.

DESCRIPTION OF EMBODIMENT

Cutting Insert

A cutting insert (also referred to below simply as an insert) according to an embodiment of the present disclosure will be described in detail with reference to the drawings. However, for ease of description, each of the figures referenced below is simplified and illustrates only main members necessary for describing each embodiment. Therefore, the cutting insert of the present disclosure may include any constituent member not illustrated in the respective figures referenced. Furthermore, the dimensions of the members in the respective figures do not faithfully represent the actual dimensions of the constituent members, dimension ratios of the members, and the like. In these points, the same applies to a cutting tool and a method for manufacturing a machined product described below.

First Embodiment

Figure 1:
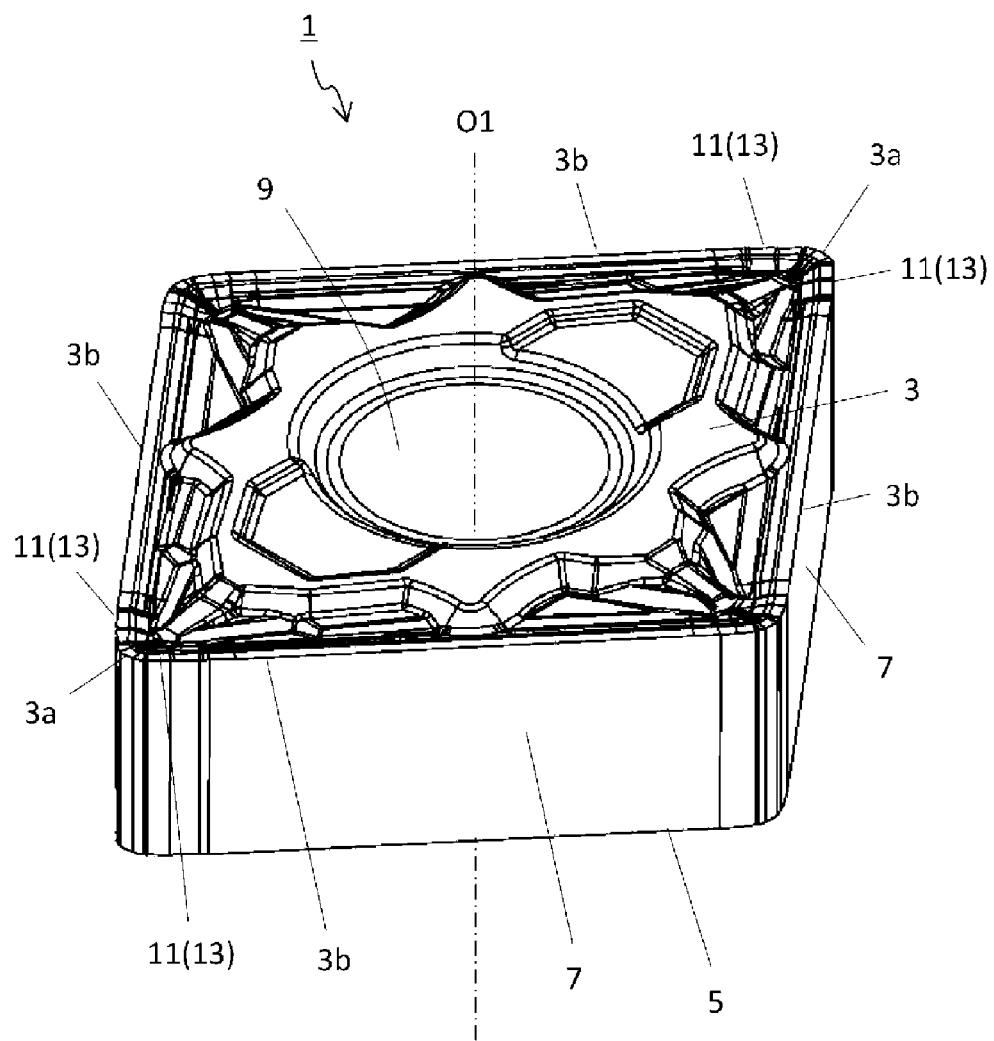
FIG. 1 is a perspective view illustrating a cutting insert according to a first embodiment of the present disclosure.
Figure 2:
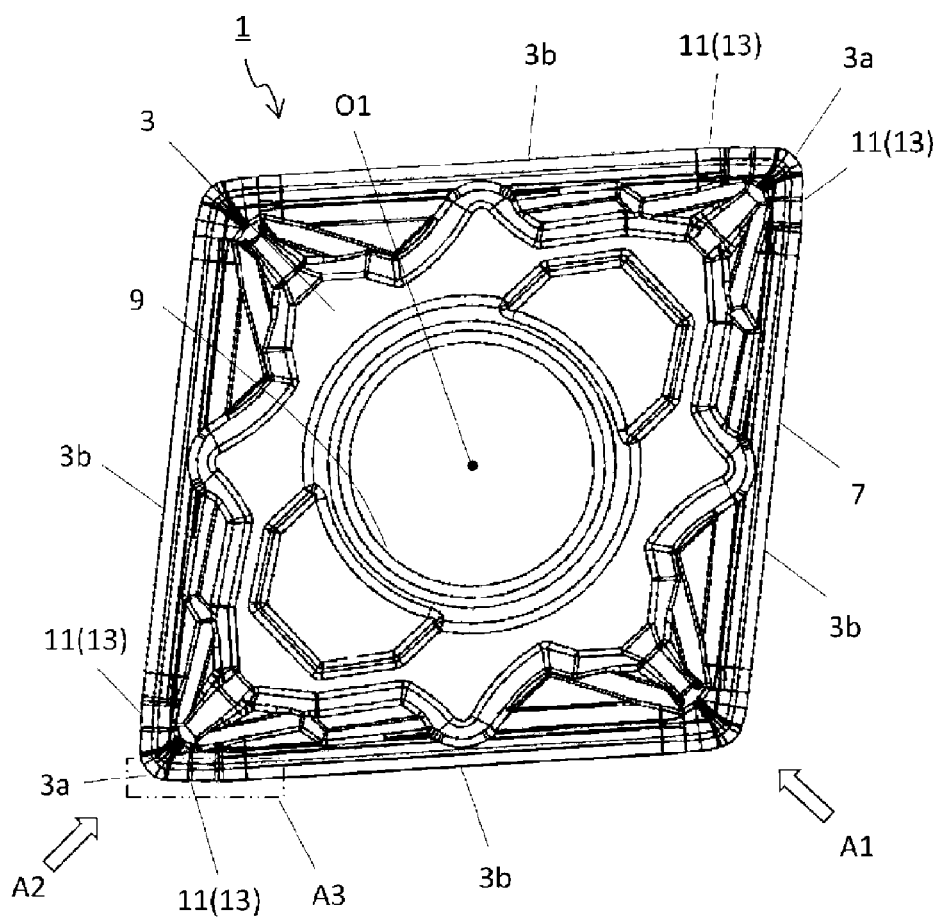
FIG. 2 is a top view of the cutting insert illustrated in FIG. 1.

An insert 1 according to a first embodiment of the present disclosure includes a top surface 3, a bottom surface 5, a side surface 7, and a ridge line 11 where the top surface 3 and the side surface 7 intersects, as illustrated in FIG. 1 and the like. The top surface 3 has substantially a polygonal shape and includes a first corner portion 3a and a first side portion 3b, as illustrated in FIG. 2. In the present embodiment, the top surface 3 has substantially a quadrilateral shape and includes four corners and four sides. The four corners include two acute angles and two obtuse angles. Each of the two acute angles is the "first corner portion 3a", and a side extending from the first corner portion 3a is the "first side portion 3b".

Note that each first corner portion 3a on the top surface 3 in the present embodiment does not form a strict corner, but has a rounded shape. Furthermore, a shape of the first side portion 3b on the top surface 3 is not limited to be strictly a linear shape, and may include a region having slightly a curved shape.

Furthermore, in the present embodiment, the top surface 3 includes two first corner portions 3a and four first side portions 3b, but a configuration of the top surface 3 is not limited to this configuration. The top surface 3 may include at least one first corner portion 3a and the first side portion 3b extending from the first corner portion 3a.

The bottom surface 5 is a surface located on a side opposite to the top surface 3, and serves as a seating face onto a pocket (insert pocket) when the insert 1 of the present embodiment is mounted to a holder. As with the top surface 3, the bottom surface 5 in the present embodiment has substantially a polygonal shape, specifically, substantially a quadrilateral shape. Then, the bottom surface 5 in the present embodiment has the same shape as the shape of the top surface 3, and when viewed from directly above, the top surface 3 overlaps with the bottom surface 5. That is, the insert 1 of the present embodiment is a so-called negative type insert. Note that the bottom surface 5 may be configured to be slightly smaller in size than the top surface 3. In this case, the bottom surface 5 is configured to have a shape similar to the shape of the top surface 3.

Note that the shapes of the top surface 3 and the bottom surface 5 are not limited to the above-described modes. For example, when viewed from directly above, the shape of the top surface 3 may be a polygonal shape such as one of a triangle, a pentagon, and a hexagon. Furthermore, in a case where the shape of the top surface 3 is a quadrilateral shape, the shape of the top surface 3 may specifically be one of a rectangular shape, a parallelogram shape, a rhombus, and a square.

Figure 3:
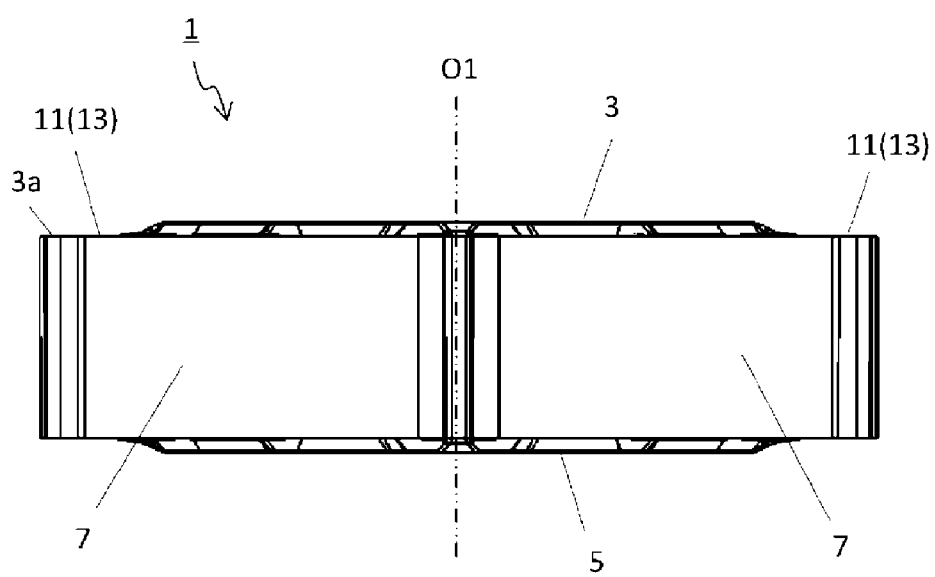
FIG. 3 is a side view from a direction A1 of the cutting insert illustrated in FIG. 2.
Figure 4:
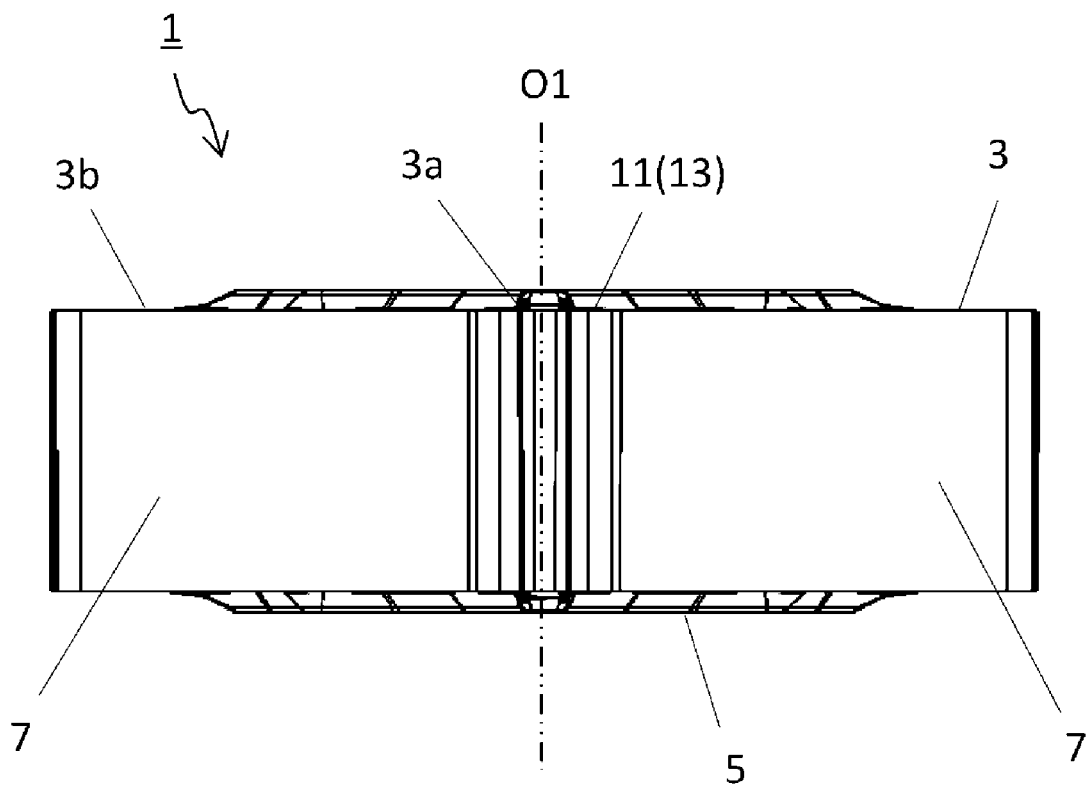
FIG. 4 is a side view from a direction A2 of the cutting insert illustrated in FIG. 2.

The side surface 7 is a surface adjacent to the top surface 3. The side surface 7 in the present embodiment is located between the top surface 3 and the bottom surface 5, and is connected to each of the top surface 3 and the bottom surface 5, as illustrated in FIGS. 3 and 4. The side surface 7 includes a flat region connected to the first side portion 3b on the top surface 3 and a curved region connected to the first corner portion 3a on the top surface 3. Then, since the insert 1 of the present embodiment is a negative type insert as described above, the side surface 7 is substantially orthogonal to the top surface 3 and the bottom surface 5.

Examples of a material of the insert 1 include a cemented carbide alloy, and cermet. Examples of composition of the cemented carbide alloy include WC-Co, WC-TiC—Co, and WC-TiC—TaC—Co. WC-Co is produced by adding a cobalt (Co) powder to tungsten carbide (WC), and sintering the mixture. WC-TiC—Co is produced by adding titanium carbide (TiC) to WC-Co. WC-TiC—TaC—Co is produced by adding tantalum carbide (TaC) to WC-TiC—Co.

Furthermore, cermet is a sintered composite material obtained by combining a metal with a ceramic component. Specifically, an example of the cermet includes a material including as a primary component a titanium compound such as one of titanium carbide (TiC) and titanium nitride (TiN).

A surface of the insert 1 may be coated with a coating film by using one of a chemical vapor deposition (CVD) method and a physical vapor deposition (PVD) method. Examples of composition of the coating film include titanium carbide (TiC), titanium nitride (TiN), titanium carbonitride (TiCN), and alumina ($Al_2O_3$).

The insert 1 of the present embodiment includes a through hole 9, as illustrated in FIGS. 1 and 2. The through hole 9 extends from the center of the top surface 3 to the center of the bottom surface 5, and is used for fixing the insert 1 to the holder. Specifically, for example, when the insert 1 is screw-fixed to the holder, a screw is inserted into the through hole 9. A method for fixing the insert 1 to the holder is not limited to the above-described screw-fixing. For example, the insert 1 may be fixed to the holder with a clamper, a lever or the like, and the through hole 9 may be used in these fixing methods. Note that as a matter of course, the insert 1 may not include the through hole 9.

A central axis O1 of the through hole 9 matches an imaginary line passing through the center of the top surface 3 and the center of the bottom surface 5. Furthermore, a direction of the central axis O1 of the through hole 9, in other words, a through direction is orthogonal to the top surface 3 and the bottom surface 5.

A size of the insert 1 is not specifically limited, but for example, the insert 1 in the present embodiment may have a maximum width when viewed from directly above (a diagonal line between the first corner portions 3a) ranging from 6 to 25 mm, and a height from the bottom surface 5 to the top surface 3 ranging from 1 to 10 mm. Here, the height from the bottom surface 5 to the top surface 3 refers to a height in a direction parallel to the central axis O1 between an upper end of the top surface 3 and a lower end of the bottom surface 5.

Here, at least a part of the ridge line 11 at which the top surface 3 intersects the side surface 7 is used as a cutting edge 13 when a work material is subjected to cut processing. Then, in the present embodiment, the top surface 3 serves as a rake face on which a chip C flows during cut processing, and the side surface 7 serves as a relief face located apart from a work material not to interfere with the work material. However, the functions of the top surface 3 and the side surface 7 are not limited to the above-described functions, and the side surface 7 may serve as a rake face and the top surface 3 may serve as a relief face.

Figure 5:
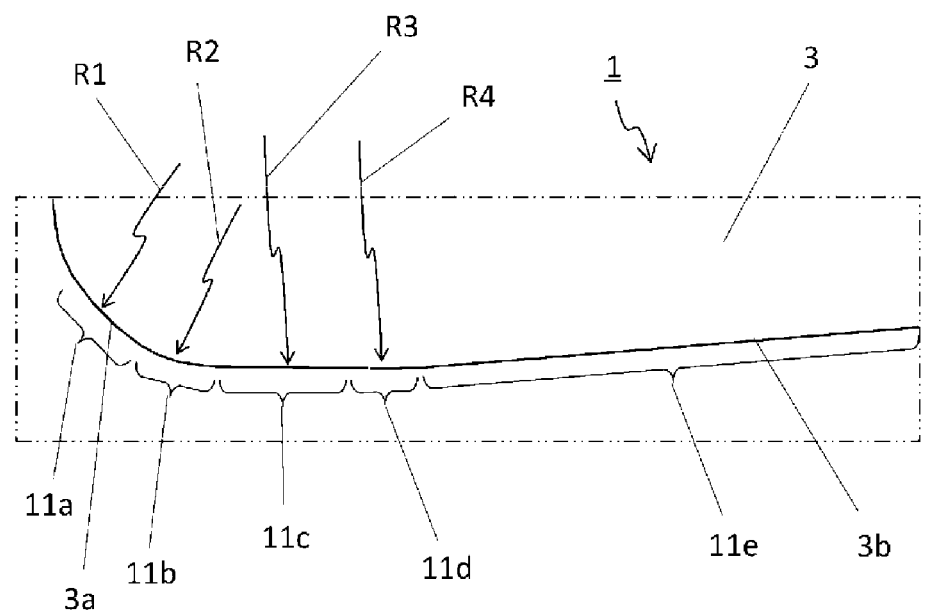
FIG. 5 is an enlarged view of a region A3 in FIG. 2.

In the present embodiment, when viewed from directly above, the ridge line 11 includes a first portion 11a, a second portion 11b, a third portion 11c, a fourth portion 11d, and a fifth portion 11e, as illustrated in FIG. 5. The first portion 11a, the second portion 11b, the third portion 11c, and the fourth portion 11d each have a curved shape protruding outward, more specifically a circular arc shape when viewed from directly above.

The first portion 11a is located at the first corner portion 3a on the top surface 3 and has a curvature radius R1. The second portion 11b is adjacent to the first portion 11a and has a curvature radius R2. The third portion 11c is close to the second portion 11b and has a curvature radius R3. The fourth portion 11d is close to the third portion 11c and has a curvature radius R4. The fifth portion 11e is adjacent to the fourth portion 11d and is located at the first side portion 3b on the top surface 3. Thus, the first portion 11a, the second portion 11b, the third portion 11c, the fourth portion 11d, and the fifth portion 11e are arranged on the ridge line 11 in order from the first corner portion 3a to the first side portion 3b. More specifically, the second portion 11b, the third portion 11c, and the fourth portion 11d, exclusive of the first portion 11a located at the first corner portion 3a and the fifth portion 11e located at the first side portion 3b, are located from the first corner portion 3a to the first side portion 3b on the top surface 3, as illustrated in FIG. 5.

Here, the term "adjacent to" herein refers to a state where portions are in contact with each other to be continuous one next to the other. Further, the term "close to" refers to a state where portions are located close to each other, and includes a concept that a portion other than portions of interest may be located between the portions of interest.

The first portion 11a can be used as a so-called corner cutting edge. Furthermore, the fifth portion 11e can be used as the cutting edge 13 mainly used in cut processing for a work material. The second portion 11b, the third portion 11c, and the fourth portion 11d can be used as a wiper edge (flat cutting edge) for enhancing machined surface smoothness of a work material in cut processing for a work material. In this case, as described below, the third portion 11c is mounted to most protrude toward a machined surface of a work material in a state where the insert 1 is mounted to the holder.

Then, in the present embodiment, the curvature radiuses R1 to R4 satisfy the following relationships. That is, the curvature radius R2 of the second portion 11b is less than the curvature radius R1 of the first portion 11a (R2<R1), the curvature radius R3 of the third portion 11c is greater than the curvature radius R1 of the first portion 11a (R3>R1), and the curvature radius R4 of the fourth portion 11d is less than the curvature radius R3 of the third portion 11c (R4<R3).

In the present embodiment, the curvature radiuses R1 to R4 satisfy the above-described relationships. Thus, a thickness of the chip C can be less likely to excessively reduce even in processing or the like in which a work material is repeatedly cut, and machined surface smoothness of a work material improves.

Figure 6:
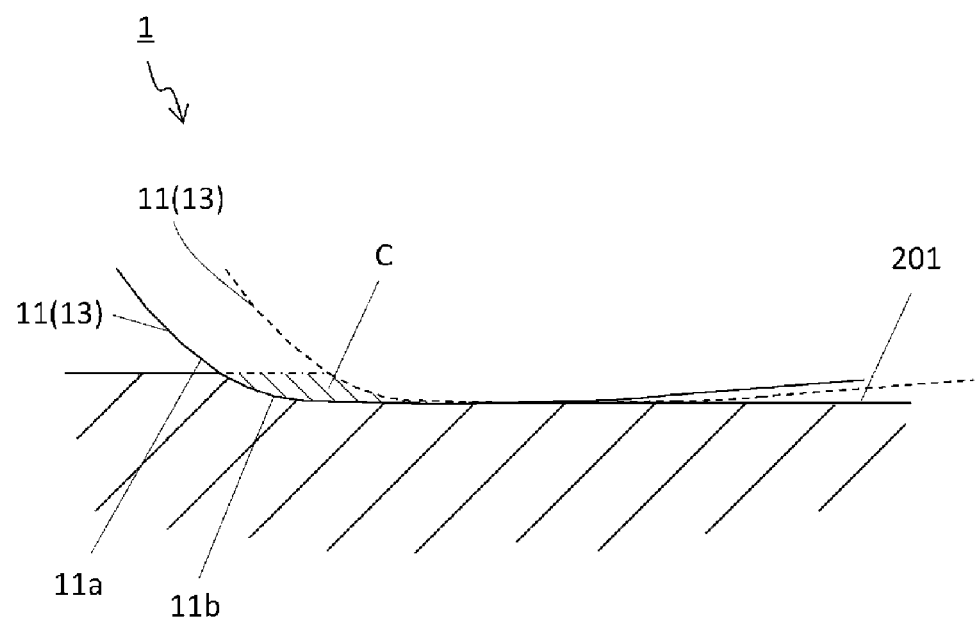
FIG. 6 is a conceptual view in a case where cut processing is performed by using the cutting insert illustrated in FIG. 5.

That is, first, in the present embodiment, the curvature radius R2 of the second portion 11b located adjacent to the first portion 11a capable of being used as a corner cutting edge is less than the curvature radius R1 of the first portion 11a (R2<R1). Accordingly, as illustrated in FIG. 6, in processing in which a work material is repeatedly cut by the wiper edge, a region where a processing trajectory of the insert 1 on which a work material is first cut overlaps with a processing trajectory of the insert 1 on which the work material is subsequently cut can be reduced in size. Thus, the thickness of the chip C generated at the second portion 11b can be less likely to excessively reduce. As a result, a machined surface of a work material can be less likely to be roughed like being torn off, and machined surface smoothness of a work material improves.

Note that, in FIG. 6, the processing trajectory of the insert 1 on which a work material is first cut is indicated by a chain line, and the processing trajectory of the insert 1 on which the work material is subsequently cut is indicated by a solid line. Furthermore, a region surrounded by both the solid line and the chain line and illustrated with oblique lines extending from the upper left to the lower right represents the chip C generated by performing cut processing of the insert twice.

In addition, in the present embodiment, the curvature radius R3 of the third portion 11c capable of being used as a wiper edge is greater than the curvature radius R1 of the first portion 11a (R3>R1). Accordingly, owing to the second portion 11b, a work material can be less likely to be roughed like being torn off, and the third portion 11c can favorably serve as a wiper edge to enhance machined surface smoothness of a work material.

Further, in the present embodiment, particularly, among the second portion 11b, the third portion 11c, and the fourth portion 11d each capable of being used as a wiper edge, the curvature radius R3 of the third portion 11c located at the center is the largest and forms a gentle curve (R1<R3 and R4<R3). Accordingly, machined surface smoothness of a work material can further be enhanced.

Thus, in the present embodiment, the curvature radiuses R1 to R4 satisfy the above-described relationships. Thus, the second portion 11b to the fourth portion 11d located between the first portion 11a capable of being used as a corner cutting edge and the fifth portion 11e capable of being used as a main cutting edge are each configured to favorably serve as a wiper edge. As a result, machined surface accuracy of a work material can be enhanced.

Furthermore, in the present embodiment, the first portion 11a, the second portion 11b, the third portion 11c, and the fourth portion 11d each have a circular arc shape protruding outward, and each have a constant curvature radius. The first portion 11a, the second portion 11b, the third portion 11c, and the fourth portion 11d each have a circular arc shape. Thus, since concentration of cutting resistance on each of the portions can be reduced, durability of each of the portions can be enhanced.

Note that in the present embodiment, as described above, the two first side portions 3b each extend from the one first corner portion 3a. Accordingly, although not illustrated, two second portions 11b are located adjacent to one first portion 11a. Furthermore, since there are the two second portions 11b with respect to the one first portion 11a, there also two third portions 11c, two fourth portions 11d, and two fifth portions 11e. However, as described above, the insert 1 may include at least the one first corner portion 3a and the one first side portion 1b, and thus there may be one third portion 11c, one fourth portion 11d, and one fifth portion 11e with respect to the one first portion 11a.

Furthermore, in the present embodiment, at least the first portion 11a and the second portion 11b serve as the cutting edge 13, and, as illustrated in FIG. 5, the third portion 11c and the fourth portion 11d also serve as the cutting edge 13. Further, at least a part of the fifth portion 11e located on the fourth portion 11d side serves as the cutting edge 13.

Note that the ridge line 11 on which the top surface 3 intersects the side surface 7 may not be strictly a linear shape. That is, the ridge line 11 may have a curved surface shape. For example, at least the first portion 11a and the second portion 11b required to have durability may each have slightly a curved surface shape. To make the ridge line 11 have a curved surface shape, a part at which the top surface 3 intersects the side surface 7 may be subjected to, for example, a known honing process.

In the insert 1 of the present embodiment, the curvature radiuses R1 to R4 are not particularly limited, but the curvature radius R1 may range from 0.2 to 1.5 mm, the curvature radius R2 may range from 0.1 to 0.5 mm, the curvature radius R3 may range from 5 to 30 mm, and the curvature radius R4 may range from 1 to 10 mm.

Note that as for a boundary at each portion, a part of the ridge line 11 at which a circular arc of the first corner portion 3a having the curvature radius R1 is in contact with the ridge line 11 corresponds to the first portion 11a. Then, a part of the ridge line 11 at which a circular arc having the curvature radius R2 is in contact with the ridge line 11 corresponds to the second portion 11b. More specifically, the second portion 11b is a portion located between a start point defined below of the second portion 11b and an end point defined below of the second portion 11b. That is, a part of the ridge line 11 at which the circular arc having the curvature radius R1 is located apart from the ridge line 11 is defined as the starting point of the second portion 11b, and a part at which the circular arc having the curvature radius R2 being in contact with the starting point of the second portion 11b and the ridge line 1 is located apart from the ridge line 11 is defined as the end point of the second portion 11b. The third portion 11c and the fourth portion 11d are also defined in the same manner as the second portion 11b.

Note that, in the present embodiment, in a case where one of the two second portions 11b adjacent to the first portion 11a is used as a wiper edge, the fifth portion 11e located on a leading end (the fourth portion 11d side) of the other of the two second portions 11b is used as the cutting edge 13 mainly used in turning processing. In this case, the fifth portion 11e located on a leading end of the one of the two second portions 11b may not be used as the cutting edge 13.

That is, in a case where the one first side portion 3b of the two first side portions 3b extending from the first corner portion 3a serves as a main cutting edge, the other first side portion 3b serves as a wiper edge. Similarly, in a case where the other first side portion 3b serves as a main cutting edge, the one first side portion 3b serves as a wiper edge. Therefore, as described above, in the insert 1, there may be the one second portion 11b, the one third portion 11c, the one fourth portion 11d, and the one fifth portion 11e located at the one first side portion 3b with respect to the one first portion 11a located at the first corner portion 3a, but a part of the other first side portion 3b is configured to serve as a cutting edge.

Then, in the present embodiment, the curvature radius R4 of the fourth portion 11d may be greater than the curvature radius R1 of the first portion 11a. According to such a configuration, improved machined surface accuracy can also be obtained in various modes of processing.

Figure 7:
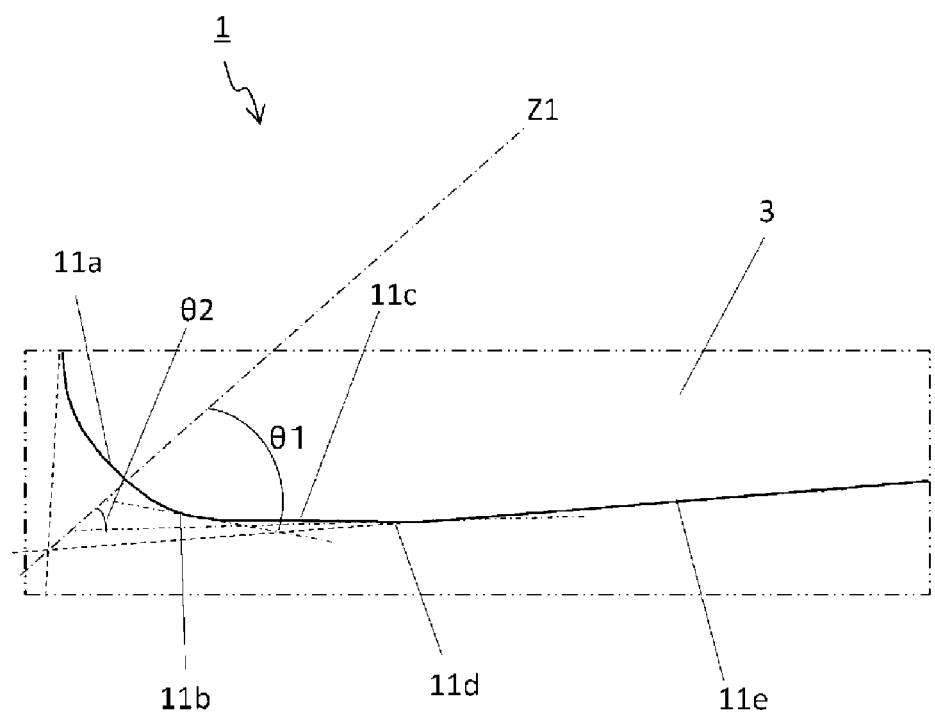
FIG. 7 is an enlarged view of the region A3 same as the region A3 in FIG. 5.

Furthermore, in the present embodiment, as illustrated in FIG. 7, when viewed from directly above, an angle $\theta 1$ formed by a bisecting line Z1 of the first corner portion 3a and the second portion 11b may be greater than an angle $\theta 2$ formed by the bisecting line Z1 of the first corner portion 3a and the fourth portion 11d. According to such a configuration, improved machined surface accuracy can be obtained in processing with a small feed rate (low feed processing) and in processing with a large feed rate (high feed processing).

Here, as illustrated in FIG. 7, the angle $\theta 1$ is an angle formed by the bisecting line Z1 and a tangential line passing through the end point of the second portion 11b, and the angle $\theta 2$ is an angle formed by the bisecting line Z1 and a tangential line passing through a starting point of the fourth portion 11d.

In the present embodiment, for example, a difference between the angle $\theta 1$ and the angle $\theta 2$ may range from 2 to 10 degrees. Furthermore, the angle $\theta 1$ may range from 45 to 65 degrees and the angle $\theta 2$ may range from 35 to 55 degrees.

Further, the fifth portion 11e located at the first side portion 3b on the top surface 3 may have a linear shape. In a case where the fifth portion 11e used as the cutting edge 13 that is mainly used has a linear shape, the thickness of the chip C becomes stable and the chip C tends to become easy to control.

Figure 8:
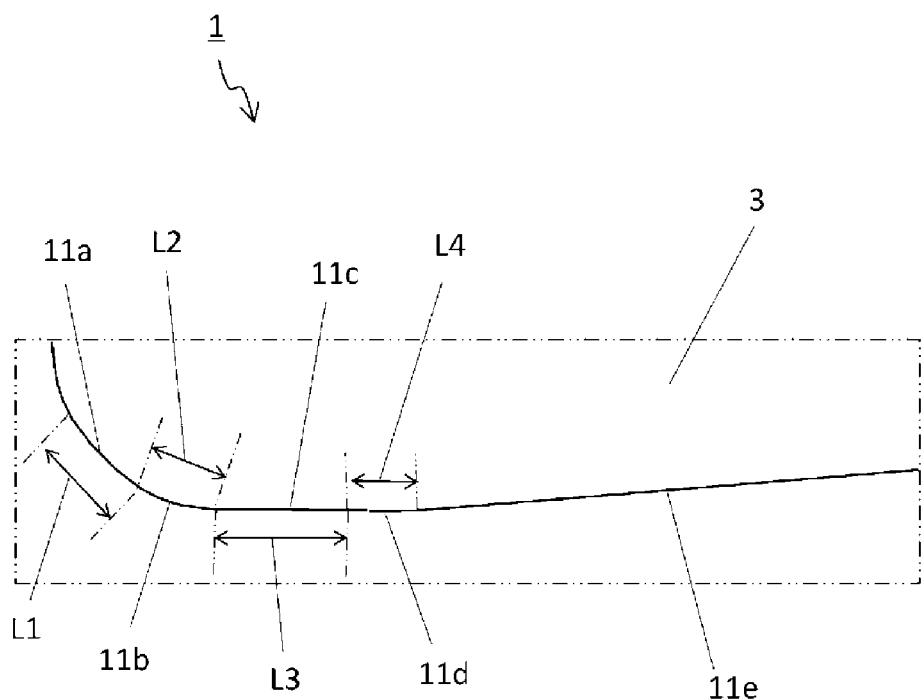
FIG. 8 is an enlarged view of the region A3 same as the region A3 in FIG. 5.

Furthermore, as illustrated in FIG. 8, in the present embodiment, when viewed from directly above, a length L2 of the second portion 11b may be less than a length L1 of the first portion 11a and a length L3 of the third portion 11c. In this case, since the length L2 of the second portion 11b is relatively reduced, a gap between the first portion 11a and the third portion 11c having the curvature radius being the largest and forming a gentle curve can be reduced. Accordingly, the length of the first portion 11a serving as a corner cutting edge can be secured, and the length of a wiper edge can be set within a favorable range without being excessively increased.

Further, when viewed from directly above, the length L2 of the second portion 11b may be greater than a length L4 of the fourth portion 11d. In this case, the chip C having a great thickness can be produced favorably at the second portion 11b.

Here, the lengths L1 to L4 of the first portion 11a, the second portion 11b, the third portion 11c and the fourth portion 11d, may each be evaluated by a length of an imaginary line segment connecting both ends (from a start point to an end point) of each of the portions when viewed from directly above.

Furthermore, in the present embodiment, the ridge line 11 may further include an eighth portion 11h (not illustrated) having a linear shape and located between the second portion 11b and the third portion 11c. According to such a configuration, the thickness of the chip C can be less likely to excessively reduce, and improved machined surface accuracy can be obtained.

Second Embodiment

Figure 9:
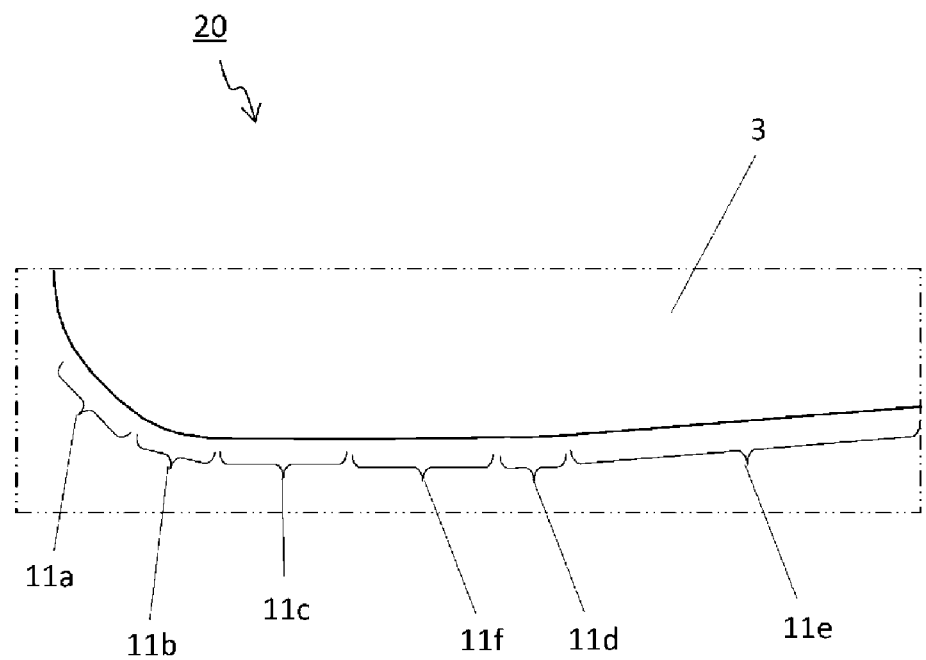
FIG. 9 is an enlarged view of a part corresponding to the region A3 in FIG. 2 of a cutting insert according to a second embodiment of the present disclosure.

Next, an insert 20 according to a second embodiment of the present disclosure will be described in detail with reference to FIG. 9. Note that portions differing from the portions of the insert 1 of the first embodiment will be described mainly below. Accordingly, as for the portions including the same configurations as in the first embodiment, the description of the first embodiment is incorporated here by reference, and description of these portions will be omitted.

The insert 20 in the second embodiment includes a top surface 3, a bottom surface 5, a side surface 7, and a ridge line 11, as with the insert 1 of the first embodiment. While the ridge line 11 in the first embodiment includes the first portion 11a to the fifth portion 11e, the ridge line 11 in the present embodiment further includes a sixth portion 11f in addition to a first portion 11a to a fifth portion 11e. When viewed from directly above, the sixth portion 11f has a linear shape located between the third portion 11c and the fourth portion 11d. That is, in the present embodiment, the sixth portion 11f having a linear shape is located on the main cutting edge side of the third portion 11c having a curvature radius being the largest. The ridge line 11 includes the sixth portion 11f, and thus, improved machined surface accuracy can be obtained even in high feed processing.

Furthermore, the sixth portion 11f may be inclined to be located apart from a machined surface of a work material from the third portion 11c side toward the fourth portion 11d side in a state where the insert 1 is mounted to a holder. According to such a configuration, a thickness of a chip C can be less likely to excessively reduce, and improved machined surface accuracy can be obtained.

Third Embodiment

Figure 10:
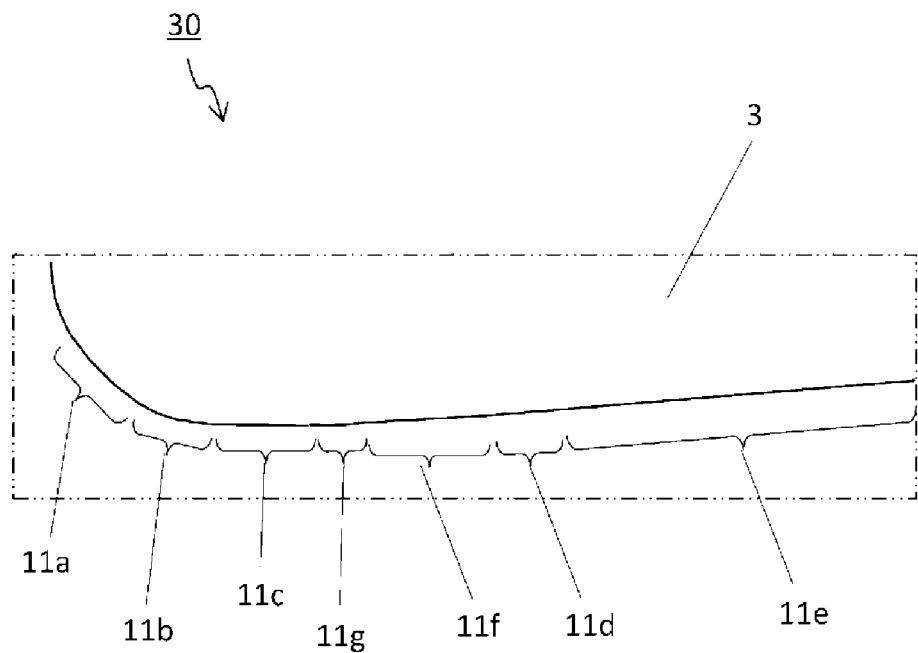
FIG. 10 is an enlarged view of a part corresponding to the region A3 in FIG. 2 of a cutting insert according to a third embodiment of the present disclosure.

Next, an insert 30 according to a third embodiment of the present disclosure will be described in detail with reference to FIG. 10. Note that portions differing from the portions of the insert 1 of the first embodiment will be described mainly below. Accordingly, as for the portions including the same configurations as in the first embodiment, the description of the first embodiment is incorporated here by reference, and description of these portions will be omitted.

The insert 30 in the third embodiment includes a top surface 3, a bottom surface 5, a side surface 7, and a ridge line 11 as with the insert 1 in the first embodiment. While the ridge line 11 in the first embodiment includes the first portion 11a to the fifth portion 11e, the ridge line 11 in the present embodiment further includes a sixth portion 11f and a seventh portion 11g in addition to a first portion 11a to a fifth portion 11e. That is, in the present embodiment, the seventh portion 11g and the sixth portion 11f are located in order from the first corner portion 3a side between the third portion 11c and the fourth portion 11d. Here, the sixth portion 11f has a linear shape when viewed from directly above. Then, the seventh portion 11g has a circular arc shape located between the third portion 11c and the sixth portion 11f. The ridge line 11 includes the sixth portion 11f and the seventh portion 11g, and thus an improved finished surface can be obtained in low feed processing regardless of a mounting state of a holder, and surface roughness can improve in high feed processing.

Further, in this case, a curvature radius R7 of the seventh portion 11g may be less than a curvature radius R3 of the third portion 11c. According to such a configuration, an effect of obtaining improved machined surface accuracy in both low feed processing and high feed processing regardless of a mounting state of a holder is enhanced.

Note that, in the present embodiment, the sixth portion 11f and the seventh portion 11g may be inclined to be located apart from a machined surface of a work material from the third portion 11c side toward the fourth portion 11d side in a state where the insert 1 is mounted to a holder. In such a configuration, as with in the second embodiment, improved machined surface accuracy can be obtained in low feed processing, and surface roughness can improve in high feed processing.

Fourth Embodiment

Figure 11:
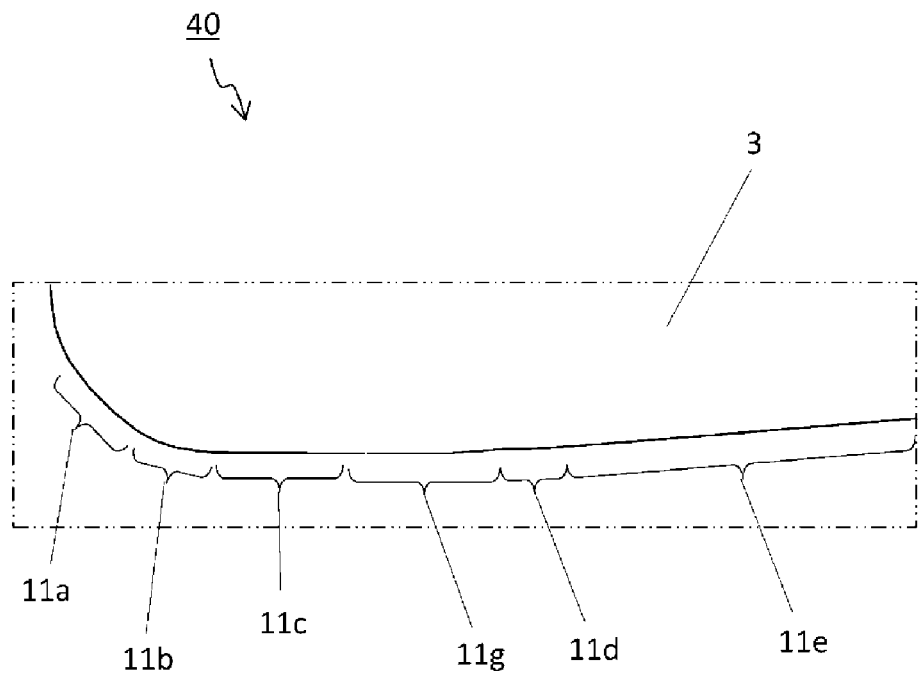
FIG. 11 is an enlarged view of a part corresponding to the region A3 in FIG. 2 of a cutting insert according to a fourth embodiment of the present disclosure.

Next, an insert 40 according to a fourth embodiment of the present disclosure will be described in detail with reference to FIG. 11. Note that portions differing from the portions of the insert 1 of the first embodiment will be described mainly below. Accordingly, as for the portions including the same configurations as in the first embodiment, the description of the first embodiment is incorporated here by reference, and description of these portions will be omitted.

The insert 40 in the fourth embodiment includes a top surface 3, a bottom surface 5, a side surface 7, and a ridge line 11 as with the insert 1 of the first embodiment. While the ridge line 11 in the third embodiment includes the sixth portion 11f and the seventh portion 11g in addition to the first portion 11a to the fifth portion 11e, the ridge line 11 in the present embodiment includes only a seventh portion 11g in addition to a first portion 11a to a fifth portion 11e. That is, in the present embodiment, when viewed from directly above, only the seventh portion 11g is located between the third portion 11c and the fourth portion 11d, and the seventh portion 11g is connected to the third portion 11c and the fourth portion 11d. In such a case, improved machined surface accuracy can also be obtained stably.

Furthermore, in this case, when a curvature radius R7 of the seventh portion 11g is less than a curvature radius of the third portion 11c when viewed from directly above, machined surface accuracy can be enhanced in low feed processing.

Note that in the present embodiment, the seventh portion 11g may be inclined to be located apart from a machined surface of a work material from the third portion 11c side toward the fourth portion 11d side in a state where the insert 1 is mounted to a holder. In such a configuration, as with the second embodiment and the third embodiment, a thickness of a chip C can be less likely to excessively reduce, and improved machined surface accuracy can be obtained.

Although the insert according to each of the embodiments of the present disclosure is described above with reference to the drawings, the insert of the present disclosure is not limited to the configurations in the above-described embodiments, and also includes various modifications without departing from the gist of the present disclosure.

For example, according to the insert of the present disclosure, the ridge line 11 on which the top surface 3 intersects the side surface 7 may include the first portion 11a, the second portion 11b, the third portion 11c, the fourth portion 11d, and the fifth portion 11e, and may include portions other than these portions.

More specifically, according to the insert of the present disclosure, the ridge line 11 may include portions other than the sixth portion 11f and the seventh portion 11g located between the second portion 11b and the third portion 11c, and between the third portion 11c and the fourth portions 11d. In this case, the portions other than the sixth portion 11f and the seventh portion 11g may each have a linear shape or may each have a curved shape.

Furthermore, the insert of the present disclosure includes a configuration including a combination of the above-described embodiments without contradiction with one another.

Cutting Tool

Next, a cutting tool 101 according to an embodiment of the present disclosure will be described with reference to the drawings.

Figure 12:
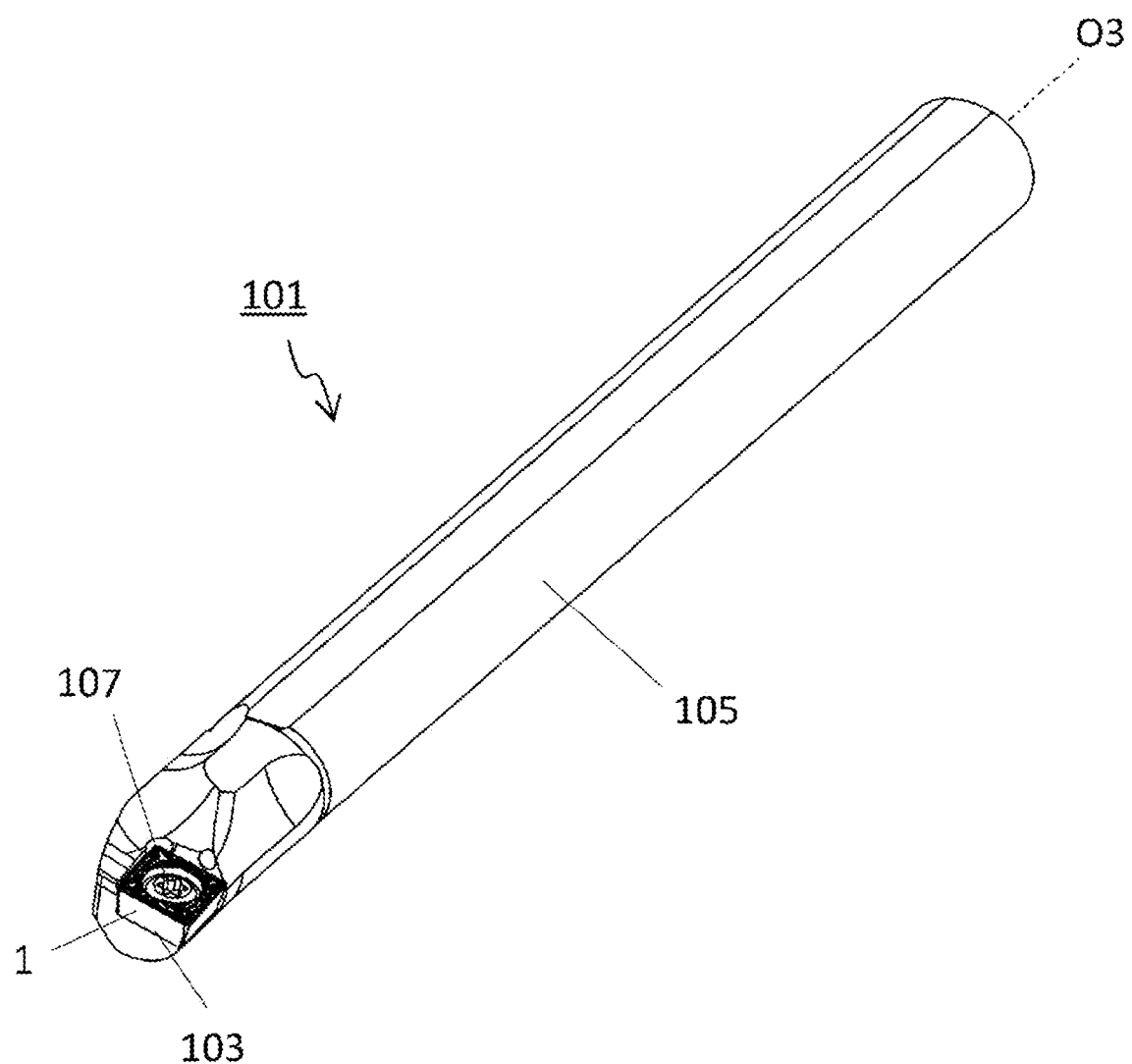
FIG. 12 is a perspective view illustrating a cutting tool according to an embodiment of the present disclosure.

The cutting tool 101 of the present embodiment includes a holder 105 including a pocket 103 (insert pocket) on the leading end side and the above-described insert 1 located in the pocket 103, as illustrated in FIG. 12. In the cutting tool 101 of the present embodiment, the insert 1 is mounted to the holder 105 such that a ridge line 11 protrudes from a leading end of the holder 105.

The holder 105 has a rod shape elongated from the leading end toward a rear end. More specifically, the holder 105 has substantially a circular shape including a central axis O3. Then, the one pocket 103 is provided on the leading end side of the holder 105. The pocket 103 is a portion to which the insert 1 is mounted, and is opened to a leading end surface and a side surface of the holder 105. In this case, the pocket 103 is also opened to the side surface of the holder 105, and thus the insert 1 can be mounted easily. Specifically, the pocket 103 includes a seating face parallel to a bottom surface of the holder 105, and a binding side face inclined with respect to the seating face.

The insert 1 is located in the pocket 103. In this case, a bottom surface of the insert 1 may be in direct contact with the pocket 103, or a sheet may be sandwiched between the insert 1 and the pocket 103.

The insert 1 is mounted such that a part of a ridge line used as a cutting edge protrudes outward from the holder 105. In the present embodiment, the insert 1 is mounted to the holder 105 with a fixing screw 107. That is, the fixing screw 107 is inserted into a through hole of the insert 1, and a leading end of the fixing screw 107 is inserted into a screw hole formed in the insert pocket 103 such that the threaded portions are screwed together. The threaded portions are screwed together, and thus the insert 1 is mounted to the holder 105.

As a material of the holder 105, steel, cast iron, or the like can be used. Among these materials, steel with high toughness may be used.

In the cutting tool 101 of the present embodiment, the third portion 11c may be located nearest the leading end side of the holder 105 among the first portion 11a to the fifth portion 11e of the insert 1. The insert 1 is mounted to the holder 105 in such disposition, and thus an effect of making a thickness of a chip C less likely to excessively reduce is enhanced, and improved machined surface accuracy can be obtained.

Here, "nearest the leading end side of the holder 105" refers to "nearest the leading end side in a direction along the central axis O3 of the holder 105".

Furthermore, in the cutting tool 101 of the present embodiment, an angle θ3 formed by the third portion 11c and the second portion 11b may be greater than an angle θ4 formed by the third portion 11c and the fourth portion 11d. According to such disposition, an effect of making the thickness of the chip C less likely to excessively reduce is enhanced, and improved machined surface accuracy can be obtained.

Figure 13:
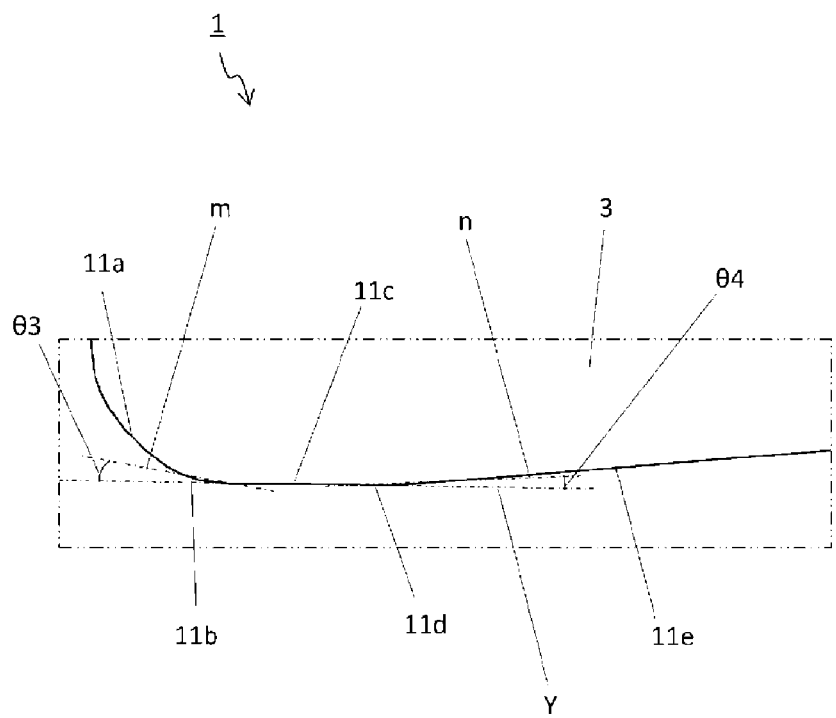
FIG. 13 is a view illustrating disposition of an insert in the cutting tool illustrated in FIG. 12.

Here, the angle θ3 is, for example, an angle formed by an imaginary line Y connecting both ends of the third portion 11c and a tangential line m at an end portion located on the third portion 11c side of the second portion 11b, as illustrated in FIG. 13. Similarly, the angle θ4 is, for example, an angle formed by the imaginary line Y connecting both the ends of the third portion 11c and a tangential line n at an end portion located on the third portion 11c side of the fourth portion 11d.

In the present embodiment, a cutting tool used for so-called turning processing is exemplified. Examples of the turning processing include inner-diameter forming, outer-diameter forming, and groove-forming. Note that the cutting tool of the present disclosure is not limited to a tool used for the turning processing. For example, the insert 1 of the above-described embodiment may be used for a cutting tool used for milling processing.

Method for Manufacturing Machined Product

Next, a method for manufacturing a machined product according to an embodiment of the present disclosure will be described with reference to the drawings.

A machined product is manufactured by subjecting a work material 201 to cut processing. The method for manufacturing a machined product in the present embodiment includes the following steps. That is, the method for manufacturing a machined product includes steps of:

(1) rotating the work material 201, (2) bringing the cutting tool 101 represented in the above-described embodiment into contact with the work material 201 that is rotating, and (3) separating the cutting tool 101 from the work material 201.

Figure 14:
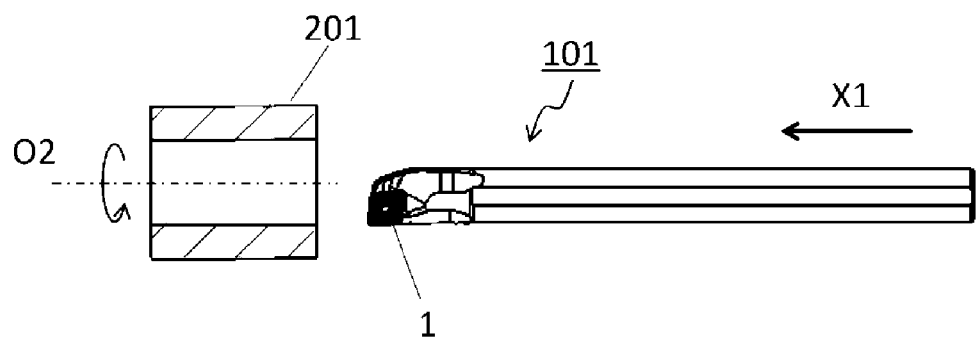
FIG. 14 is a top view illustrating a step of a method for manufacturing a machined product according to an embodiment of the present disclosure.
Figure 15:
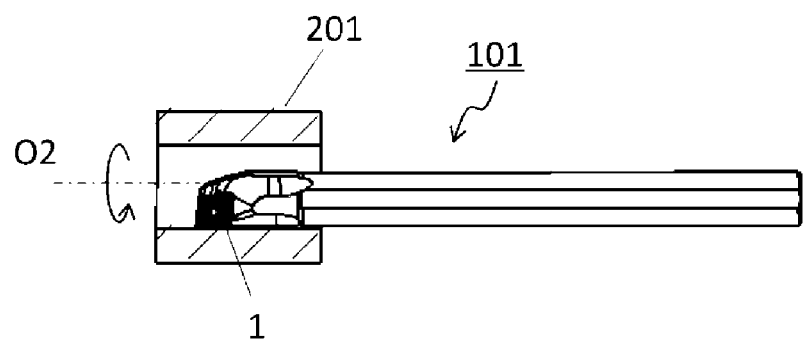
FIG. 15 is a top view illustrating a step of the method for manufacturing a machined product according to an embodiment of the present disclosure.
Figure 16:
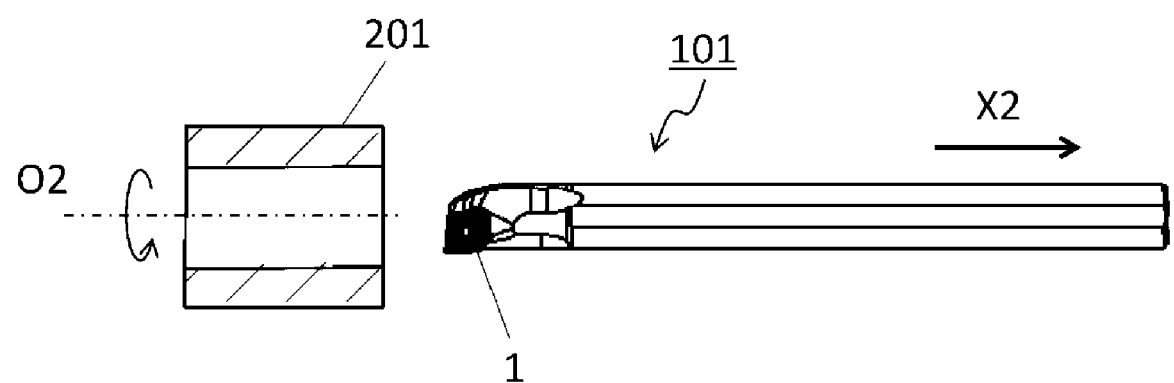
FIG. 16 is a top view illustrating a step of the method for manufacturing a machined product according to an embodiment of the present disclosure.

More specifically, first, as illustrated in FIG. 14, the work material 201 is caused to rotate about an axis O2, and the cutting tool 101 is brought relatively close to the work material 201. Next, as illustrated in FIG. 15, the cutting tool 101, more specifically, the ridge line 11 (cutting edge) of the cutting tool 101 is brought into contact with the work material 201 to cut the work material 201. Then, as illustrated in FIG. 16, the cutting tool 101 is relatively separated away from the work material 201.

In the present embodiment, the cutting tool 101 is brought close to the work material 201 by moving the cutting tool 101 in a direction X1 in a state where the axis O2 is fixed and the work material 201 rotates. Furthermore, in FIG. 15, the work material 201 is cut by bringing the cutting edge of the insert into contact with the work material 201 that is rotating. Furthermore, in FIG. 16, the cutting tool 101 is separated away by moving the cutting tool 101 in a direction X2 in a state where the work material 201 rotates.

Note that, in the cut processing in the manufacturing method of the present embodiment, at each of the steps, the cutting tool 101 is brought into contact with or separated from the work material 201 by moving the cutting tool 101, but as a matter of course the present embodiment is not limited to such a mode.

For example, in step (1), the work material 201 may be brought close to the cutting tool 101. Similarly, in step (3), the work material 201 may be separated away from the cutting tool 100. In a case where the cut processing is to be continued, a step of maintaining the state where the work material 201 rotates and bringing a cutting edge of the insert into contact with different locations on the work material 201 may be repeated.

Note that examples of a material of the work material 201 include carbon steel, alloy steel, stainless steel, cast iron, and a non-ferrous metal.

The embodiments according to the present disclosure are exemplified above. However, the present disclosure is not limited to the above-described embodiments, and as a matter of course the present disclosure can include any embodiment without departing from the gist of the present disclosure.

REFERENCE SIGNS LIST

1 Cutting insert (Insert)
3 Top surface
3a First corner portion
3b First corner portion
5 Bottom surface
7 Side surface
9 Through hole
O1 Central axis of insert
O2 Central axis of holder
11 Ridge line
11a First portion
11b Second portion
11c Third portion
11d Fourth portion
11e Fifth portion
11f Sixth portion
11g Seventh portion
11h Eighth portion
13 Cutting edge
L1, L2, L3, L4 Length
101 Cutting tool
103 Pocket (Insert pocket)
105 Holder
107 Fixing screw
201 Work material

What is claimed is:

1. A cutting insert comprising:
a top surface including a first corner portion and a first side portion extending from the first corner portion; and
a side surface adjacent to the top surface,
wherein at least a part of a ridge line where the top surface and the side surface intersects is a cutting edge,
the cutting edge includes a first portion located at the first corner portion, a second portion adjacent to the first portion, a third portion close to the second portion, a fourth portion close to the third portion, and a fifth portion adjacent to the fourth portion and located at the first side portion,
when viewed from directly above, the first portion, the second portion, the third portion, and the fourth portion each have a circular arc shape, and
when viewed from directly above, a curvature radius R2 of the second portion is less than a curvature radius R1 of the first portion, a curvature radius R3 of the third portion is greater than the curvature radius R1 of the first portion, and a curvature radius R4 of the fourth portion is less than the curvature radius R3 of the third portion,
wherein the ridge line further includes a sixth portion having a linear shape and located between the third portion and the fourth portion.

2. The cutting insert according to claim 1, wherein the curvature radius R4 of the fourth portion is greater than the curvature radius R1 of the first portion.

3. The cutting insert according to claim 1, wherein, when viewed from directly above, an angle θ1 formed by a bisecting line Z1 of the first corner portion and the second portion is greater than an angle θ2 formed by the bisecting line Z1 of the first corner portion and the fourth portion.

4. The cutting insert according to claim 1, wherein, when viewed from directly above, a length L2 of the second portion is less than a length L1 of the first portion and a length L3 of the third portion.

5. The cutting insert according to claim 1, wherein, when viewed from directly above, a length L4 of the fourth portion is less than a length L2 of the second portion.

6. The cutting insert according to claim 1, wherein, when viewed from directly above, the fifth portion has a linear shape.

7. The cutting insert according to claim 1, wherein the ridge line further includes a seventh portion located between the third portion and the sixth portion, and
the seventh portion has a circular arc shape when viewed from directly above.

8. The cutting insert according to claim 7, wherein a curvature radius R7 of the seventh portion is less than the curvature radius R3 of the third portion.

9. The cutting insert according to claim 1, wherein the ridge line further includes an eighth portion having a linear shape and located between the second portion and the third portion.

10. The cutting insert according to claim 1, wherein the second portion, the third portion, and the fourth portion each serve as a wiper edge.

11. A cutting tool comprising:
a holder including a pocket on a leading end side; and
a cutting insert mounted to the pocket of the holder, the cutting insert comprising:
a top surface including a first corner portion and a first side portion extending from the first corner portion; and
a side surface adjacent to the top surface,
wherein at least a part of a ridge line where the top surface and the side surface intersects is a cutting edge,
the cutting edge includes a first portion located at the first corner portion, a second portion adjacent to the first portion, a third portion close to the second portion, a fourth portion close to the third portion, and a fifth portion adjacent to the fourth portion and located at the first side portion,
when viewed from directly above, the first portion, the second portion, the third portion, and the fourth portion each have a circular arc shape, and
when viewed from directly above, a curvature radius R2 of the second portion is less than a curvature radius R1 of the first portion, a curvature radius R3 of the third portion is greater than the curvature radius R1 of the first portion, and a curvature radius R4 of the fourth portion is less than the curvature radius R3 of the third portion,
wherein the third portion is located nearest the leading end side of the holder among the first portion to the fifth portion.

12. The cutting tool according to claim 11, wherein an angle θ3 formed by the third portion and the second portion is greater than an angle θ4 formed by the third portion and the fourth portion.

13. A method for manufacturing a machined product, the method comprising steps of:
rotating a work material;
bringing the cutting tool according to claim 11 into contact with the work material that is rotating; and
separating the cutting tool from the work material.

* * * * *